United States Patent [19]

Mizuta et al.

[11] Patent Number: 4,698,571
[45] Date of Patent: Oct. 6, 1987

[54] POSITION CONTROL APPARATUS FOR AUTOMOBILE DRIVER

[75] Inventors: Ken Mizuta, Miyagi; Shiro Kondo, Furukawa, both of Japan

[73] Assignee: Alps Electric Co., Ltd., Japan

[21] Appl. No.: 843,123

[22] Filed: Mar. 24, 1986

[30] Foreign Application Priority Data

Mar. 23, 1985 [JP] Japan .............................. 60-41025[U]

[51] Int. Cl.$^4$ ............................................. G05B 19/42
[52] U.S. Cl. .................................... 318/568; 318/103; 318/466
[58] Field of Search ............... 318/568, 287, 603, 466, 318/467, 468, 103; 297/330

[56] References Cited

U.S. PATENT DOCUMENTS

| 3,288,947 | 11/1966 | Wanlass et al. | 200/6 |
| 4,128,797 | 12/1978 | Murata | 318/568 X |
| 4,401,928 | 8/1983 | Kamijo et al. | 318/466 |
| 4,467,252 | 8/1984 | Takeda et al. | 318/568 |
| 4,468,596 | 8/1984 | Kinli et al. | 318/286 X |
| 4,523,136 | 6/1985 | Dudeck et al. | 318/568 |

Primary Examiner—Benjamin Dobeck
Attorney, Agent, or Firm—Guy W. Shoup

[57] ABSTRACT

Disclosed is a system for automatically adjusting parts of the environmental settings surrounding an automobile driver such as the setting of the rear view mirrors, the seat portion, and so forth; to a predetermined optimum setting for the individual driver. The system includes operating buttons for first adjusting the settings manually to an optimum position, position detectors for sensing the position of each part of the environment, a memory unit for storing the optimum positions and a control unit for moving the respective parts from an arbitrary position to the optimum positions stored in the memory unit when a command key is depressed.

10 Claims, 8 Drawing Figures

POSITION CONTROL APPARATUS FOR AUTOMOBILE DRIVER

FIELD OF THE INVENTION

The present invention relates to an apparatus which is used in an automobile to adjust the position of the driver's seat and other aspects of the driver's environment according to the driver's individual characteristics.

BACKGROUND OF THE INVENTION

The optimum angular position of the rear-view mirror and the optimum position of the driver's seat differ according to the individual characteristics of each driver using the automobile, including physical shape, posture, and driving habits. Sometimes, an automobile is driven by several people, for example, members of a family or business establishment. In this case, the optimal environment for the driver will vary as each different person drives the car. Hence, whenever a different person drives the car, the driver's environment (i.e. mirrors, seat position, seat belt, steering wheel tilt, etc.) needs to be adjusted. These adjustments are cumbersome to make. But if the car is started without adjusting the driver's environmental setting, then the driver will have to drive in an unnatural posture which will result in fatigue or lead to the occurrence of an accident.

SUMMARY OF THE INVENTION

In view of the foregoing, it is the object of the present invention to provide an apparatus capable of properly adjusting the driver's environmental settings, i.e., mirrors and to suit an individual driver's characteristics with a simple operation.

A structure for achieving the aforementioned object is now described by referring to FIG. 1, where a rear-view mirror and the driver's seat of an automobile are indicated by M and S, respectively. The control apparatus for properly adjusting the angular position of the mirror M and the position of the seat S to suit the driver's individual characteristics comprises a mirror angle-adjusting means 11, a seat position-adjusting means 12, a computer memory 13 for storing data representing the preferred settings of each of a plurality of drivers, an angle detecting means 14 for detecting the angular position of the mirror, a position detecting means 15 for detecting the position of the driver's seat, and a control unit 16. The data representing the preferred settings of each driver (hereafter, the optimum position) is previously set for each of the plurality of persons who drive the automobile. The control unit 16 receives position signals from the detecting means 14 and 15 and uses them to determine the actual position of the driver's seat, mirror, etc. The actual positions are compared against the optimum positions stored in the memory 13, and from this comparison the control unit 16 produces control signals which are applied to the angle-adjusting means 11 and the position-adjusting means 12, such that they adjust the mirrors and seat to the optimum setting.

Usually, the aforementioned settings for driving differ between normal forward driving and during reverse, in reverse such as when backing into a garage. For this reason, it is desired that data for backward driving is stored in the memory 13, together with data for normal forward driving. The data for backward driving is read from the memory and used to adjust the driver's seat/-mirror environment when driving in reverse as well as when driving forward.

DETAILED DESCRIPTION OF THE INVENTION

Figure 2:
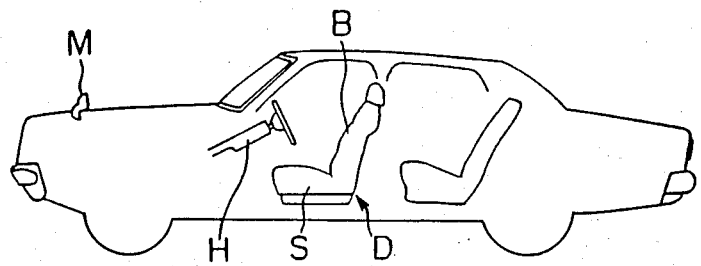
FIG. 2 is a schematic representation of an automobile.

Referring to FIG. 2, there is shown an automobile in which an apparatus according to the invention is installed. The apparatus acts to control the angular position of the rear-view mirror M and the position d of the driver's seat S. In this specific example, the apparatus is designed to be capable of adjusting the reclining angle of the backrest B relative to the seat S, as well as the longitudinal position D of the seat S relative to the steering wheel H.

Figure 1:
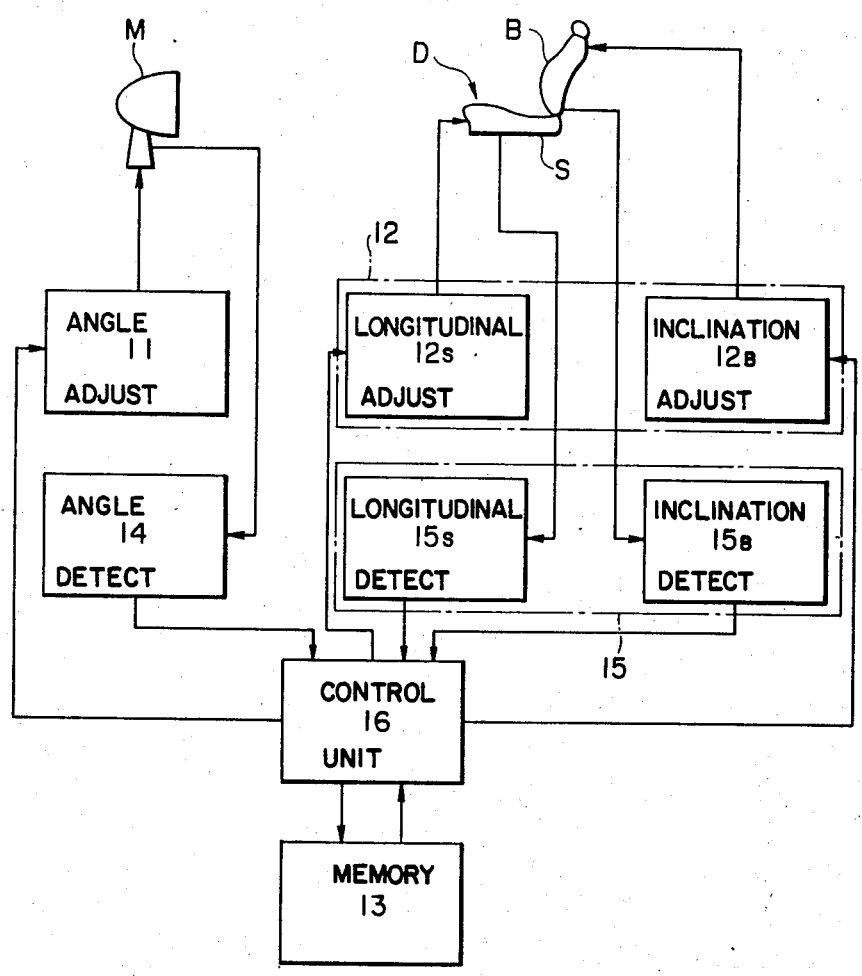
FIG. 1 is a block diagram of an apparatus according to the invention, for illustrating the concept of the invention.

Referring back to FIG. 1, the seat position-adjusting means 12 described above comprises a longitudinal position-adjusting means $12_S$ for adjusting the longitudinal position of the driver's seat and an inclination-adjusting means $12_B$ for adjusting the reclining angle of the backrest B. The means 15 for detecting the position D of the driver's seat is compressed of a longitudinal position-detecting means $15_S$ and an inclination=-detecting means $15_B$. Optimum position data for normal forward driving is stored in the memory 13. Further, optimum position data for reverse driving is also stored in the memory 13.

Figure 3:
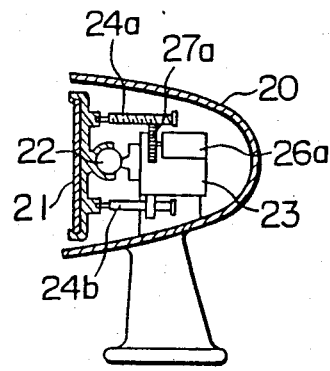
FIG. 3 is a longitudinal cross section of a mirror angle-adjusting means.
Figure 4:
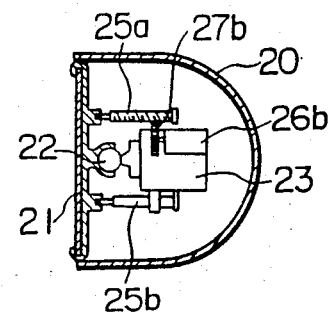
FIG. 4 is a transverse cross section of the mirror angle-adjusting means shown in FIG. 3.

The structure of a mirror angle-adjusting means 11 is particularly shown in FIGS. 3 and 4. The adjusting means 11 includes a mirror casing 20 having an opening. A mirror 21 is disposed at this opening. The rear side of the mirror 21 is held by a spherical coupling 22 of a support member 23 mounted inside the casing 20 so that the mirror 21 can tilt in any desired direction. An upper operation rod 24a and a lower operation rod 24b are mounted via spherical couplings to the mirror 21 in symmetrical relation vertically about he coupling 22. A left operation rod 25a and a right operation rod 25b, are mounted via spherical ouplings to the mirror in symmetrical relation horizontally about the coupling 22. These rods 24a, 24b, 25a, 25b are held to the support member 23 such that they can slide along their respective axes. One rod 24a of the vertically symmetrically arranged operation rods 24a and 24b is threaded. Similarly, one rod 25a and 25b is threaded. These threaded rods 24a and 25a are in mesh with gears 27a and 27b, respectively, mounted to the output shafts of electric motors 26a and 26b, respectively. The rods 24a and 24b are shifted forward and backward by appropriately driving the motor 26a, in order to tilt the mirror 21 upwardly and downwardly. When the rods 25a and 25b are similarly moved forward and backward, the mirror 21 is inclined left and right. By combining these operations, the mirror 21 can be inclined about the spherical coupling 22 in any desired direction.

Figure 5:
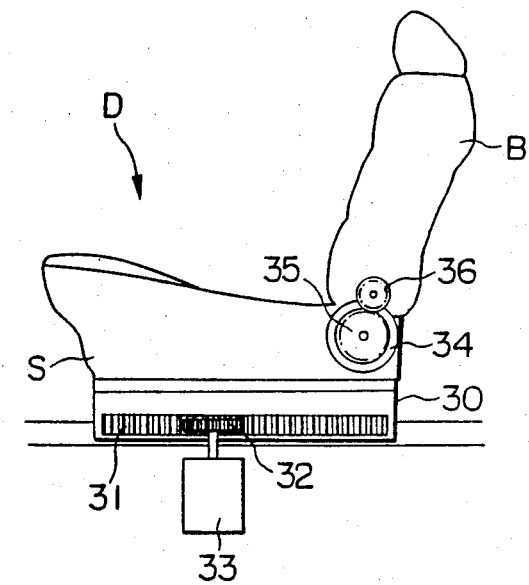
FIG. 5 is a side elevation of a seat position-adjusting means.

Referring next to FIG. 5, there is shown one specific example of a means which adjusts the position D of the driver's seat. The driver's seat S is fixedly mounted on a sliding support 30 to which a rack 31 is attached. A pinion 32 is in mesh with the rack 31 and attached to the output shaft of an electric motor 33. When the motor 33 is driven, the seat S is moved forward or backward, i.e., the seat is moved toward or away from the steering wheel H. This constitutes the seat longitudinal position-adjusting means $12_S$. The backrest inclination=adjusting means $12_B$ for adjusting the reclining angle of the backrest B is composed of an electric motor 34, a gear 35 mounted to the output shaft of the motor 34, and another gear 36 that is in mesh with the gear 35. The gear 36 is mounted to the backrest B.

Referring back to FIG. 1, the angle detecting means 14 detects the angular position of the rear-view mirror M which is shifted by the mirror angle-adjusting means 11. The longitudinal detecting means $15_S$ detects the position D of the driver's seat that is shifted by the longitudinal adjusting means $12_S$. The inclination detecting means $15_B$ detects the reclining angle of the backrest B that is adjusted by the backrest inclination adjusting means $12_B$. More specifically, the angle detecting means 14 disposed in association with the angle-adjusting means 11 includes encoders for detecting the rotation of the gears 27a and 27b and photosensors for detecting the sliding operation of rods 24a, 24b, 25a, 25b. Preferably, a photosensor or the like that detects the distance traveled by the sliding support 30 is used in the longitudinal detecting means $15_S$ which is disposed in association with the longitudinal position-adjusting means $12_S$ of the seat. An encoder or the like that detects the angular position changes of the gear 35 can be used in the inclination detecting means $15_B$ for measuring the inclination angle when the backrest inclination-adjusting means $12_B$ is operated.

Figure 6:
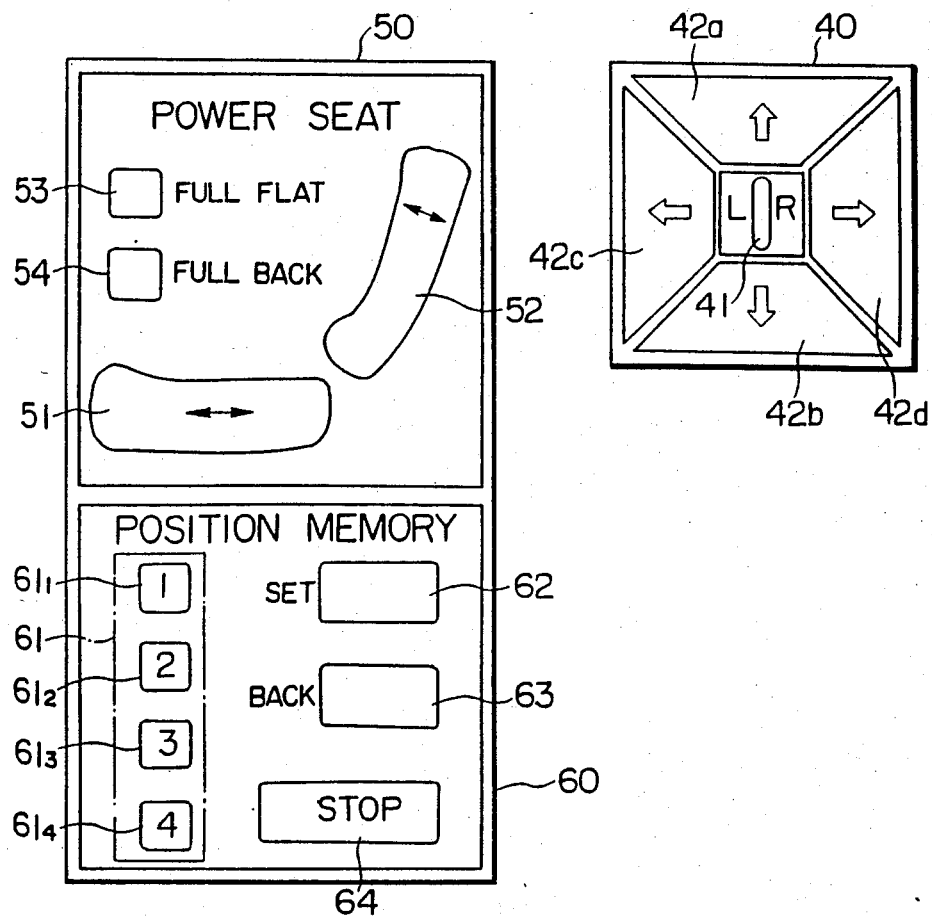
FIG. 6 shows the arrangement of the push-button switches on a control console used to operate the control unit shown in FIG. 1.

Referring next to FIG. 6, a control section 40 is provided as part of the automobile is control console and it is used to manually control the mirror angle-adjusting means 11. Another control section 50 is employed to control the longitudinal adjust means $12_S$ and the backrest inclination-adjusting means $12_B$. A further control section 60 allows the user to apply instruction signals to the control unit 16. These control sections 40, 50, 60 are disposed close to the position D of the driver's seat which is shifted by the mirror angle-adjusting means 11. The longitudinal detecting means $15_S$ detects the position D of the driver's seat so that the driver may easily operate them.

The control section 40 has a lever 41 at its center. When the lever 41 is swung left or right, the angular position of a respective side-view mirror M on the left or right side of the automobile can be adjusted. When the lever 41 is in its neutral position, both of the two side mirrors M (only one is shown) are locked so that neither can be adjusted. Four momentary-contact switches 42a, 42b, 42c, 42d are disposed around the lever 41. When one of these switches is depressed, the mirror 21 is tilted upwardly, downwardly, to the left, or to the right.

A momentary-contact switch 51 for adjusting the position D of the driver's seat is disposed on the control section 50. Another momentary-contact switch 52 for adjusting the reclining angle of the backrest B is also disposed on the control section 50. When the switch 51 is depressed, the position D of the driver's seat is moved forward toward the steering wheel H, for example. When the switch 52 is depressed, the backrest B is angularly moved toward its upright position. A full flat switch 53 and a full back switch 54, each of which consists of a tact switch, are also disposed on the control section 50. When the full flat switch 53 is depressed, the backrest B is rotated to its substantially horizontal, flat position. When the full back switch 54 is depressed, the position D of the driver's seat is brought to its rearmost position at which it is farthest from the steering wheel.

The control section 60 has various push-button switches for applying instruction signals to the control unit 16. Four push-button switches $61_1$–$61_4$ of a switch group 61 are respectively assigned to identify one of four persons who drive the automobile. When one of the four identification switches $61_1$–$61_4$ is depressed, data representing the preferred (optimum) positions for the corresponding driver is read from the memory 13. Data representing the optimum positions for driving in forward is written to the memory 13 using a set switch 62 of the push-button type. Data about the positions utilized by the drivers during reverse/driving, i.e. backing into garages, is read from or written to, the memory using a back switch 63 of the push-button type. Further, an emergency switch 64 is disposed so that movement of the mirror or driver's seat can be halted immediately during an adjustment operation.

Figure 7:
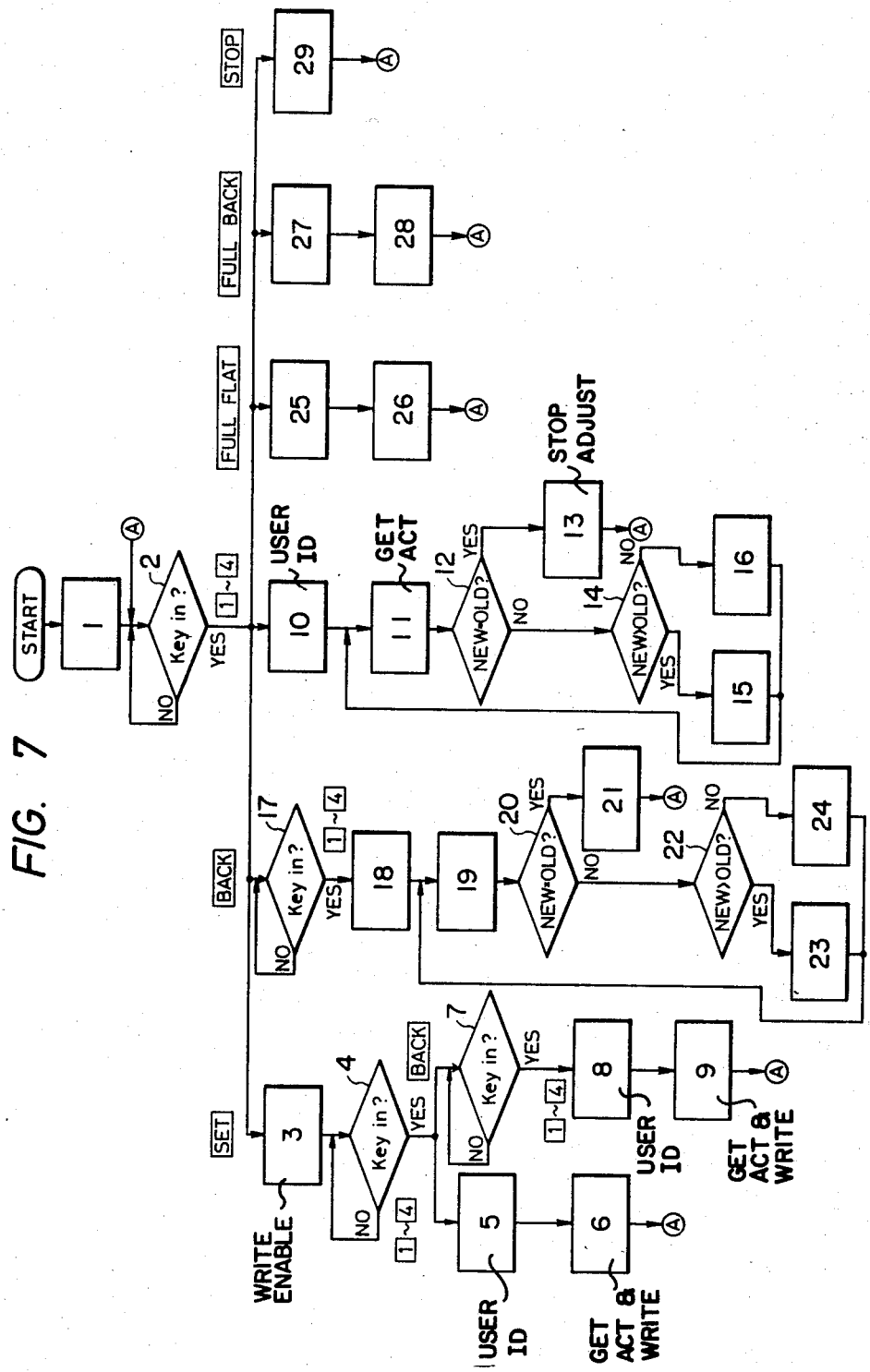
FIG. 7 is a flowchart illustrating the operations of the control unit shown in FIG. 1.

The manner in which the positions for driving are controlled is now described by referring to the flowchart of FIG. 7. When the starter of the automobile is operated (START), the microprocessor (control unit) is initialized, i.e. interruption is inhibited, the full back position and the full flat position are set, and a timer and other devices are initialized (step 1). This condition is maintained until any one of the switches on the control section 60 is depressed (step 2).

In order to store the optimum positions preferred by each driver into memory, the set switch 62 is depressed, thus making preparations for writing of data into the memory 13 (step 3). Then, this condition is maintained until the driver keys in further data (step 4). If one of the user-identifying switches $61_1$–$61_4$ of the switch group 61 is depressed, the address assigned to the driver is set (step 5). Under this condition, the current setting s(actual) of the mirror, seat, etc. are detected and read in as the optimum positions (OPT) at step 6. More specifically, the angular position of the rear-view mirror M, the position D of the driver's seat, and the reclining angle of the backrest B are first adjusted to the driver's taste by manually operating the control sections 40 and 50. These positions are detected by the detecting means 14, $15_S$, $15_B$. The resulting position signals after the user has finished manually adjusting the various parts represent the optimum positions for that user and these are applied to the control unit 16, which writes them into the memory 13 when the set button 62 is pressed. If data has been already placed in the memory 13 with the same user identification address, then this old data is erased simultaneously with the writing of the new data.

In order to store the optimum positions best suited to the driver when the car is backed in reverse, the back switch 63 is depressed under the waiting condition of step 4. Then, the waiting condition is maintained until the driver keys in further data (step 7). Under this condition, if one of the identification switches $61_1$–$61_4$, assigned to the driver is depressed, then the address assigned to the driver is set (step 8). Subsequently, the current or actual positions, ACT, are obtained from the detecting means 14, $15_S$, $15_B$ and this data is stored in the memory 13 (step 9) as the optimum set of positions for backing the vehicle. In this way, the data about the positions best suited for each driver during normal forward driving and reverse driving are successively stored in the memory 13.

The angular position of the mirror M, the position D of the driver's seat, and the reclining angle of the backrest B are adjusted to the positions best suited to each driver in the manner described below. Staring at the waiting condition of step 2, one of the switches $61_1$–$61_4$ which has been assigned to the individual driver is depressed. Then, the address associated with the thus identified driver at step 10. Subsequently, the detecting means 14, $15_S$, $15_B$ detect the actual angular position of the mirror M, the actual position of the driver's seat, and the actual reclining angle of the backrest B, and the resultant data (ACT) is read (step 11). These actual positions are successively compared with the previously stored optimum settings (OPT) for the driver (step 12). If all corresponding data items, i.e. the angular positions of the mirror M, the position D of the driver's seat, and the reclining angle of the backrest B match (ACT=OPT); the mirror angle adjusting means 11, the longitudinal position-adjusting means $12_S$, and the backrest inclination-adjusting means $12_B$ are caused to stop their operation by generating a first control signal (output #1) at step 13. If there is a difference between the actual and optimum positions (ACT≠OPT) for any one of adjustable devices, for example, the longitudinal position D of the driver's seat, then a comparison is made to see if ACT<OPT (step 14). If so, the seat position-adjusting means $12_S$ is operated to move the position D of the driver's seat forward, for example at step 15 (output 2) to increase the value of the actual seat position ($ACT_S$). If the comparison made at step 14 reveals that ACT>OPT, then the seat position-adjusting means $12_S$ is operated to move the position D of the seat rearward at step 16 (output 3). After the adjustment is made by the seat position-adjusting means $12_S$ (output 2 or 3), the actual position (ACT) is again read (step 11). This signal is again compared with the optimum position (OPT) stored in memory at step 12. The condition of output 2 or 3 is maintained and the adjusting means $12_S$ is repeatedly operated until the relation ACT-≠OPT is achieved, whereupon the operation of the seat position-adjusting means $12_S$ is stopped (output 1). In this way, adjustments are also successively made by the backrest angle-adjusting means $12_B$ and the mirror angle-adjusting means 11, as well as by the seat position-adjusting means $12_S$ Thus, these devices are adjusted to positions best suited for the identified driver.

In order to adjust the driver's settings when driving in reverse such as backing into a garage, for example, the back switch 63 is first depressed under the waiting condition of step 2. Then, another waiting condition is entered (step 17) until any one switch of the user-identifying switch group 61 is depressed, whereupon the address is set in the same manner as in the case of normal driving (step 18). Subsequently, actual position data (ACT) derived from the detecting devices 11, $12_S$ and $12_B$, is obtained (step 19). the actual positions are then successively compared with the optimum positions stored in memory (step 20). If the relationship ACT-≠OPT Holds, output 1 for stopping the operation of the adjusting means is delivered (step 21). If the inequality relation ACT≠OPT holds, a comparison is made to see if ACT<OPT (step 22). If the result is YES, out put 2 is delivered to make an increasing adjustment in the same manner as described before (step 23). If the opposite relation, ACT>OPT holds, output 3 is delivered to make adjustments in the opposite direction using the adjusting means (step 24). The adjustments are repeated until all the new detected positions (ACT) equal the corresponding optimum settings stored in memory at which time the settings of the driver's environment are those preferred by the driver for reverse drive.

In the waiting state of step 2, if the full flat switch 53 on the control section 50 is depressed, the angular distance to the full flat position is calculated (step 25). Then, an offset value is delivered to the inclination adjust means (step 26), so that the backrest B becomes substantially coplanar with the seat S, i.e., the full flat condition is attained. If the full back switch 54 is depressed, the distance to the full back position from the current position is calculated (step 27). Then, an offset output is delivered to shift the position D of the driver's seat to its rearmost position most remote from the steering wheel H (step 28). This allows the driver to easily get in and out of the car. When an adjustment is being made for normal drive or reverse drive as mentioned above, or when an operation is being performed to attain the full flat or rearmost position condition, if the stop switch 64 is depressed, a control signal is output to all the adjustment means (step 29), stopping their operation immediately.

In the above example, the user-identifying set 61 of the push-button switches consists of four switches $61_1$–$61_4$. The point is that a plurality of persons can optimally set positions for driving according to their characteristics by pushing a single button thus achieving the position with a simple operation. But identifying schemes using more keys are also included within the scope of the present invention. Also, the specific structures of the means for adjusting the mirror M and the position D of the driver's seat are not limited to the structures already described. Any other adjusting means may be employed as long as it allows automatic adjustment which is initiated by depressing push-button switches installed near the driver's seat. Further, a means for adjusting the height of the driver's seat may be added to the driver's seat position-adjusting means, the length of the seat belt (safety restraint) may be adjusted before buckling in, a tiltable stirring column may be tilted to a desired angle, and so forth.

As described above in detail, the novel apparatus is installed in an automobile that is allowed to be driven by a plurality of persons, and enables the driver to optimally adjust environmental settings such as the angular position of the rear-view mirrors, the position of the driver's seat, and the reclining angle of the backrest, according to the driver's characteristics with a simple operation. Consequently, the driver will be comfortable and will be capable of driving the automobile smoothly and safely.

Figure 8:
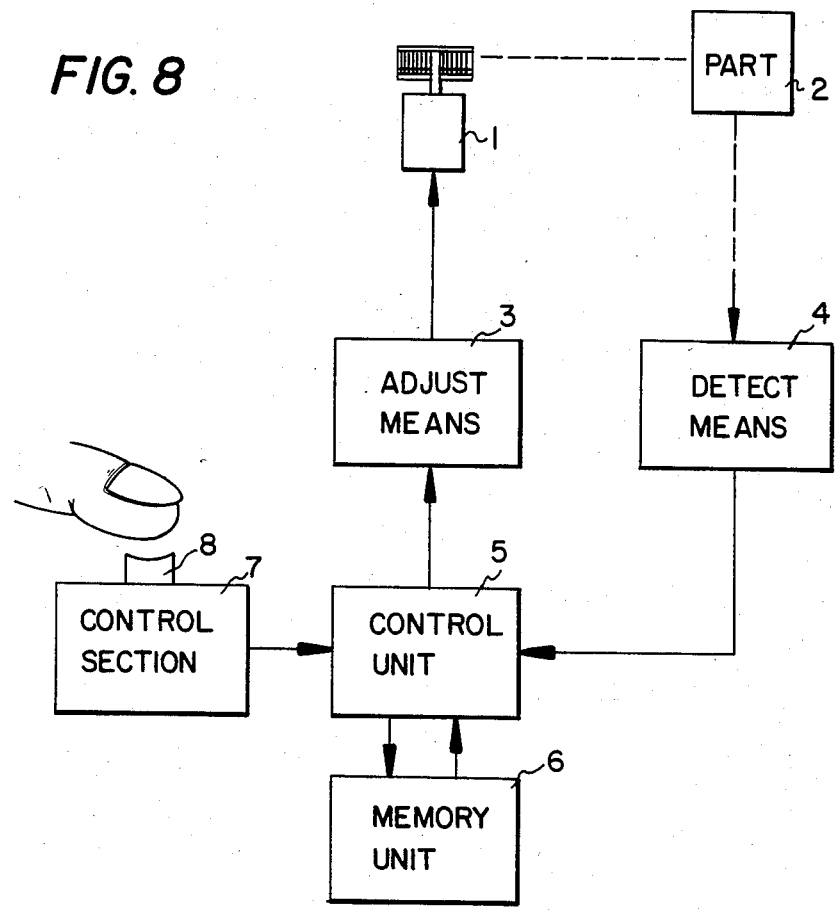
FIG. 8 is a block diagram for explaining the present invention.

FIG. 8 is a simplified block diagram for explaining the concept of the present invention. In brief, an electric actuator such as a rotary motor 1, is coupled to an automobile part 2 in the driver's environment which is to be adjusted. The motor 1 is part of an adjustment means 3 which is responsive to control signals from a control unit 5. Detecting means 4 coupled to the part to be adjusted 2 supply the control unit 5 with information regarding the actual position of the part 2.

A control section 7 allows the user to manually adjust the part 2 to a desired position. This desired position is sensed by the detecting means and stored in a memory unit 6. The control section has an actuating button 8 associated with the position data stored in the memory unit 6. When this button 8 is operated, the control unit 5 senses the actual position of the part 2, compares it with the desired position stored in memory and if different, issues command signals to move the part 2 to the desired position.

What is claimed is:

1. A position control apparatus for automatically adjusting parts of an automobile driver's environmental setting, including a rear view mirror and a driver's seat, in accordance with individual preferences of a particular driver, comprising:
   position adjusting means including a longitudinal position adjusting means for adjusting the position of the driver's seat in a longitudinal direction and mirror angle adjusting means for adjusting the angle of the rear view mirror, said position adjusting means being coupled to said parts and being responsive to control signals from a control unit for adjusting each of said parts to a desired position;
   said control unit, and memory means coupled to said control unit for storing driver's seat longitudinal position data and rear view mirror angle data therein;
   manula operating means operatively coupled to said longitudinal position adjusting means and said mirror angle adjusting means for manually adjusting each of said parts to respective positions desired by a particular driver;
   detecting means coupled to each of said parts and said control unit for detecting the actual positions of each of said parts and supplying actual position data thereon to said control unit;
   memory setting means coupled to said control unit for instructing said control unit to store actual position data in said memory means corresponding to optimum actual positions for said driver's seat and rear view mirror manually adjusted by said manual operating means and detected by said detecting means; and
   select means coupled to said control unit for instructing said control unit to select optimum position data stored in said memory means for a particular driver and to send control signals to said longitudinal position adjusting means and said mirror angle adjusting means for adjusting each of said parts to respective positions represented by said selected optimum position data.

2. A position control apparatus according to claim 1 wherein said memory means includes means for storing and retrieving a plurality of data, each subset of said plurality of data comprising of position data associated with a particular one of a plurality of drivers; and
   said select means includes identifying keys for identifying and selecting a desired subset of said plurality of data.

3. A position control apparatus according to claim 2 wherein said identifying keys comprise individual keys each one assigned to a particular driver out of said plurality of drivers.

4. A position control apparatus to claim 1 wherein the position data stored in said memory means includes data associated with forward driving and data associated with driving in reverse; and said select means includes means for indicating whether the automobile is to be driven in forward or reverse gear and selecting the appropriate one of said data associated with forward driving and said data associated with driving in reverse.

5. A position control apparatus according to claim 1 wherein said parts further include the backrest of the driver's seat and said position adjustment means includes inclination adjustment means for the backrest inclination.

6. A position control apparatus according to claim 1 wherein said position adjustment means includes vertical adjusting means for adjusting the vertical height of said driver's seat; and the detecting means for sensing the vertical height of the driver's seat.

7. A position control apparatus according to claim 1 wherein said position adjustment means includes a rotary electric motor controlled by said control signals to adjust one of said parts.

8. A position control apparatus according to claim 7 wherein said detecting means includes means for detecting the degree of rotation of said rotary electric motor.

9. A position control apparatus according to claim 3 wherein said means for detecting the degree of rotation of said rotary motor includes photosensor means.

10. A position control apparatus according to claim 1 further including means for adjusting said driver's seat to a predetermined longitudinal position located away from the driver's steering wheel.

* * * * *